United States Patent
Hancock et al.

(10) Patent No.: US 7,321,316 B2
(45) Date of Patent: Jan. 22, 2008

(54) GROUPING MESH CLUSTERS

(75) Inventors: Martin A. Hancock, Victoria (CA);
Arthur B. Wynans, Victoria (CA);
Eric K. Haight, Victoria (CA); Hugh T. Lindsay, East Sooke (CA); Simon H. Lightbody, Victoria (CA); Aaron J. Taylor, Brentwood Bay (CA); Scott M. Henneberry, Franklin, TN (US)

(73) Assignee: Power Measurement, Ltd., Saanichton (CA)

( * ) Notice: Subject to any disclaimer, the term of this patent is extended or adjusted under 35 U.S.C. 154(b) by 151 days.

(21) Appl. No.: 11/122,411

(22) Filed: May 4, 2005

(65) Prior Publication Data

US 2006/0066455 A1    Mar. 30, 2006

Related U.S. Application Data

(63) Continuation-in-part of application No. 10/892,837, filed on Jul. 16, 2004, now Pat. No. 7,089,089.

(60) Provisional application No. 60/488,700, filed on Jul. 18, 2003.

(51) Int. Cl.
*G08C 17/02* (2006.01)

(52) U.S. Cl. .................. 340/870.02; 370/335; 700/286

(58) Field of Classification Search ........... 340/870.02, 340/870.11; 370/335, 351; 700/286
See application file for complete search history.

(56) References Cited

U.S. PATENT DOCUMENTS

| | | | |
|---|---|---|---|
| 3,534,247 A | 10/1970 | Miljanic | |
| 4,749,992 A | 6/1988 | Fitzemeyer et al. | |
| 4,841,236 A | 6/1989 | Miljanic et al. | |
| 5,438,329 A * | 8/1995 | Gastouniotis et al. | .. 340/870.02 |
| 5,710,723 A | 1/1998 | Hoth et al. | |
| 5,748,104 A | 5/1998 | Argyroudis et al. | |
| 5,854,994 A | 12/1998 | Canada et al. | |
| 5,874,903 A | 2/1999 | Shuey et al. | |
| 5,892,758 A | 4/1999 | Argyroudis et al. | |
| 5,923,269 A | 7/1999 | Shuey et al. | |
| 6,018,700 A | 1/2000 | Edel | |
| 6,052,364 A | 4/2000 | Chalmers et al. | |
| 6,115,653 A | 9/2000 | Bergstrom et al. | |

(Continued)

FOREIGN PATENT DOCUMENTS

WO    WO 02/39242    5/2002

(Continued)

*Primary Examiner*—Timothy Edwards, Jr.
(74) *Attorney, Agent, or Firm*—Workman Nydegger

(57) ABSTRACT

Systems and methods for grouping mesh networks. Mesh networks enable energy data to be transferred from an energy sensing device to a destination device using various networks and reduces the need to install metering stations. Embodiments of the invention join or group mesh networks that otherwise are not able to communicate. The connections between the grouped mesh networks can be passive using directional antennas or passive antennas or active using higher power RF devices, solar repeaters, mobile mesh devices, etc. The energy data is routed in a smart manner, by performing load balancing at gateways, by monitoring the signal to noise ratio of available communication paths, etc. Mesh clusters can also be created to define low power clusters, address blocking clusters, and frequency based clusters. Grouping clusters facilitates the efficient transfer of energy data from an energy sensing device to a energy management station.

42 Claims, 6 Drawing Sheets

U.S. PATENT DOCUMENTS

| | | |
|---|---|---|
| 6,333,975 B1 * | 12/2001 | Brunn et al. ............ 379/106.03 |
| 6,373,399 B1 | 4/2002 | Johnson et al. |
| 6,437,692 B1 | 8/2002 | Petite et al. |
| 6,653,945 B2 | 11/2003 | Johnson et al. |
| 6,712,616 B2 | 3/2004 | Albrektson |
| 6,804,790 B2 | 10/2004 | Rhee et al. |
| 7,000,021 B1 | 2/2006 | Radhakrishnan et al. |
| 7,079,551 B2 | 7/2006 | Shivnan |
| 7,089,089 B2 | 8/2006 | Cumming et al. |
| 2002/0019725 A1 | 2/2002 | Petite |
| 2003/0001754 A1 | 1/2003 | Johnson et al. |
| 2003/0099221 A1 | 5/2003 | Rhee |
| 2003/0174067 A1 | 9/2003 | Soliman |
| 2004/0028023 A1 * | 2/2004 | Mandhyan et al. ......... 370/351 |
| 2005/0132080 A1 | 6/2005 | Rhee et al. |

FOREIGN PATENT DOCUMENTS

| | | |
|---|---|---|
| WO | WO 02/075565 | 9/2002 |
| WO | WO 03/047175 | 6/2003 |

* cited by examiner

GROUPING MESH CLUSTERS

CROSS-REFERENCE TO RELATED APPLICATIONS

This application is a continuation-in-part of U.S. patent application Ser. No. 10/892,837, entitled "Methods and Apparatus for Retrieving Energy Readings from an Energy Monitoring Device" and filed Jul. 16, 2004, now U.S. Pat. No. 7,089,089, which claims the benefit of U.S. Provisional Application No. 60/488,700 filed Jul. 18, 2003 and entitled "A Wireless Communication Network and RF Devices for Non-Intrusive Energy Monitoring and Control". This application is also related to U.S. patent application Ser. No. 11/083,909 entitled "Solar Powered Radio Frequency Device Within an Energy Sensor System" and filed Mar. 18, 2005, and to U.S. patent application Ser. No. 11/122,380, entitled "Data Integrity in a Mesh Network" and filed the same day as the present application. The foregoing applications are incorporated by reference in their entirety.

BACKGROUND OF THE INVENTION

Embodiments of the invention relate to systems and methods for metering energy in an energy distribution system. More particularly, embodiments of the invention relate to systems and methods for transmitting energy data by grouping mesh clusters to facility the transfer of the energy data from an energy sensing device to an energy management station.

Typically metering a particular point within an energy distribution system, such as an electrical distribution system, can be very costly and there are monetary and practical barriers to installing metering points. Some of these costs are external components such as potential transformers or current transformers, commissioning costs, measurement cabinet costs and installation costs.

A large installation cost associated with metering points is the cost and installation of communication wires including conduits for the communication wires. The availability of existing communication, cost of extending those communications, and the labor involved in running the communication wires can be prohibitive when evaluating the benefit of adding a new metering point. Alternatively, a metering point may be installed without any communication. In this case, someone must physically go to the meter and read a display, recording the energy values, and transporting this information to a central system. This approach is prone to human error in addition over time it can be an expensive communication method.

Another large installation cost associated with some metering points is the cost of providing an adequate power supply or separate power supply to the metering device. For example, a metering device may be monitoring at a point of a large voltage potential, while the device may be able to monitor the voltage potential, the control power required for the device must be at a significantly lower potential. Alternatively, a metering device may be monitoring a non-electrical quantity such as the output of a flow meter. There may not be a conventional power supply for the metering device accessible; in which case, additional installation expense is required to provide control power to the metering device.

A further installation cost associated with the physical mounting to the metering point. Typically metering points must be mounted into a measurement cabinet or measurement rack of some sort with a hole for a display or mounting screws to secure the metering device to the cabinet or rack. Many times display holes and screw holes must be made in the measurement cabinet or a measurement cabinet itself must be purchased further adding to the installation costs.

Typically, commissioning costs of energy metering points are relatively high. Often there is a need to have a factory representative on site to fully commission an energy metering system. In addition, there can be errors that are difficult to correct if the incorrect settings are sent to the metering device. An example of a commissioning error occurs when a monitoring device is set to an incorrect PT or CT ratio for electrical energy monitoring as incorrect primary measurements may be calculated from the secondary measurements. Another example may include setting up an incorrect value per pulse for the monitoring of a pulse output from another metering device. Additional commissioning costs include the manual setup for communication of monitoring devices with the energy metering system or SCADA software. Each metering point connected has to have communications configured at the metering point as well as at the software system. Any error in these configurations at either site can result in no communications and may require troubleshooting which further increases commissioning cost.

Typically the advantages of installing metering points closer to the supply of the energy outweigh the barriers; however, as the energy travels closer down the energy distribution system to the consumer and finally to the load, the costs of metering points often outweighs the benefits. However, there is a desire and financial benefit to monitoring energy distribution at additional metering points; especially further down the energy distribution system towards the load. When more information is known of the energy used, more can be done to reduce energy usage. There is a need to reduce the cost of ownership of an additional metering point within an energy management system. There is a need to reduce installation, commissioning, and costs of external components such as current transformers, potential transformers, and measurement cabinets. When these costs are reduced, the financial reward of energy cost analysis outweighs the reduced cost barriers of metering closer to each energy load. These additional metering points can assist in creating a clearer representation of energy costs throughout a facility and that information can assist the facility in reducing its energy costs.

In facilities, e.g. buildings or installations, where a significant amount of power is used among a variety of units, it would be desirable to allow the building owner to allocate energy costs to the different units, i.e. consumers, within the facility. For a commercial office building, these units may include the different tenants within the building or the common loads for the facility, such as the elevators or HVAC systems. For an industrial facility, these units may include the different production lines, machines or processes within the facility. As opposed to allocating costs based on a fixed or formulaic approach (such as pro-rata, e.g. dollars per square foot or based on the theoretical consumption of a process/machine), an allocation based on actual measurements using appropriate monitoring devices may result in more accurate and useful information as well as a more equitable cost distribution.

Both installation and ongoing, i.e. operational and maintenance, costs for these monitoring devices are important considerations in deciding whether a monitoring system is worth the investment. While monitoring devices may be read manually, which does not increase the installation cost, manual data collection may increase on-going/operational costs. Alternatively, monitoring devices may be interconnected and be automatically read via a communications link. However, typical communication links require wiring to interconnect the devices which increases the installation cost. In addition, a particular tenant in the building may wish to verify that they are being billed correctly by reading the energy meter or other energy monitoring device that is accumulating their energy usage. This may be a straightforward, although labor intensive and cumbersome, process with a typical energy meter which provides a display viewable by the tenant.

Emerging wireless mesh (or ad-hoc) networking technologies can be used to reduce the installation costs of monitoring devices while providing for automated data collection. Also called mesh topology or a mesh network, mesh is a network topology in which devices are connected with many redundant interconnections between network nodes. Effectively, each network node acts as a repeater/router with respect to received communications where the device is not the intended recipient in order to facilitate communications between devices across the network. Using wireless interconnections permits simpler and cost-effective implementation of mesh topologies wherein each device is a node and wirelessly interconnects with at least some of the other devices within its proximity using RF based links. Mesh networking technologies generally fall into two categories: high-speed, high bandwidth; and low speed, low bandwidth, low power. The first category of devices are typically more complex and costly that the second. Since energy monitoring does not typically require high speed/high bandwidth communication, the second category of devices is often sufficient in terms of data throughput.

Energy monitoring devices may include electrical energy meters that measure at least one of kWh, kVAh, kVARh, kW demand, kVA demand, kVAR demand, voltage, current, etc. Energy monitoring devices may also include devices that measure the consumption of water, air, gas and/or steam.

BRIEF SUMMARY OF THE INVENTION

Embodiments of the invention relate to systems and methods for grouping mesh clusters. The grouped mesh clusters are used, by way of example, to transmit energy data collected by an energy sensor or other monitoring device to a destination device such as an energy management station. Joining or grouping mesh clusters can provide several advantages including higher bandwidth for the transmission of energy data and smart routing of the energy data. In some instances, a long range connection can reduce the number devices or repeaters needed to group mesh clusters together.

The connections used to group mesh clusters can be passive or active. Grouping mesh clusters can also include forming one or more separate mesh clusters from a larger mesh cluster. The connections can be passive antennas, devices with higher RF power, solar based devices or repeaters, and may also include alternative connections such as other frequency spectrums. The connections may also include mediums such as plain old telephone system ("POTS"), power line carriers, broadband frequencies, coaxial cables, IEEE 802.11a, IEEE 802.11b, IEEE 802.11g, IEEE 802.11s protocols and systems, serial connections, Ethernet, and the like or any combination thereof.

Gateways can be established that can collect data before forwarding the data. This can extend the data storage and enable data compression as well. This can improve bandwidth as well as enhance security.

In one embodiment, mesh clusters are grouped by identifying at least a first mesh cluster and a second mesh cluster. One of the mesh clusters typically includes an energy sensing device. Then the method groups the first mesh cluster with the second mesh cluster. The grouping can include passive and/or active connections as well as the use of alternate frequencies. Finally, the energy data collected by the energy sensing device is transmitted to the second mesh cluster.

In another example, a method first collects energy data using a first RF device within a first mesh cluster. Then, the method connects at least one device in the first mesh cluster with at least one device in a second mesh cluster using a passive connection. Next, the method routes data from the first RF device to a gateway through the second mesh cluster over the passive connection.

In another example, the method groups a mesh cluster having one or more devices into at lest a first mesh cluster and a second mesh cluster. Next, the first mesh cluster is configured such that communications between devices in the first mesh cluster do not interfere with communications in the second mesh cluster. Then, the method establishes a connection between the first mesh cluster and the second mesh cluster. The method can be passive, active, or use an existing infrastructure whether wireless or wired.

These and other advantages and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Figure 1:
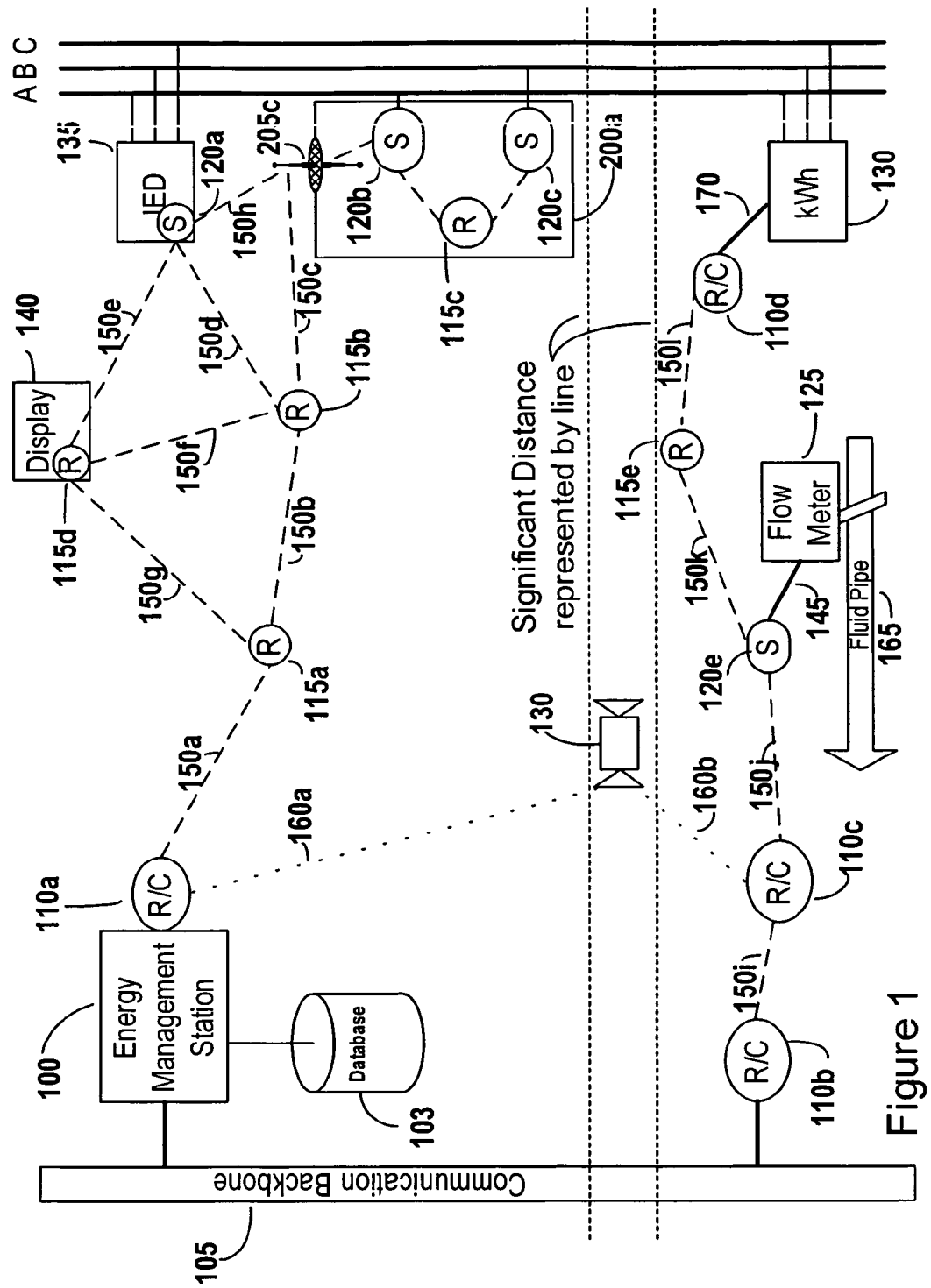
FIG. 1 illustrates an exemplary embodiment including multiple mesh clusters for implementing embodiments of the invention.

Herein, the phrase "coupled with" is defined to mean directly connected to or indirectly connected through one or more intermediate components. Such intermediate components may include hardware, communication and software-based components. Additional intermediate components may include electrical field coupled and magnetic field coupled components. The figures included in this document refer to various groups of items using a number prefix and a letter as a suffix, such as 110a, 110b, and 110c. The number listed alone without the letter suffix refers to at least one of these items. An example of this is when a group of items such as the repeater converters are referred to as repeater converters 110, this is meant to refer at least one of the repeater converters 110a, 110b, or 110c.

Embodiments of the invention relate to systems and methods for grouping mesh networks, also referred to herein as mesh clusters. In some instances, grouping mesh networks may include splitting mesh networks into multiple mesh networks. In other embodiment, grouping mesh networks may include linking mesh networks together.

Grouping mesh networks together has a beneficial impact on how data is transferred. The ability to route data may be improved and made more reliable. Depending on how the mesh networks are grouped, simultaneous and high data volume communications can occur and data collisions may be avoided. Grouping mesh networks may include, by way of example and not limitation, the creation of mesh clusters within a network, intelligent grouping of RF devices or nodes, intelligent routing of data, and multiple gateways. Grouping mesh networks may protect against communication loss, provide a less costly architecture, enable encryption over long transmission distances, and facilitate inexpensive and portable grouping.

The present embodiments reduce the costs of metering by reducing the installation costs and commissioning costs for metering points. In addition, the present embodiments reduce the need for external components such as potential transformers, current transformers, and measurement cabinets. The present embodiments are able to reduce these costs by using various combinations of the following technology discussed below. By reducing these costs, the number of metering points within an energy distribution system, such as an electrical energy distribution system, may be increased; similar approaches may be used to increase the number of metering points throughout other energy distribution systems such as water, air, gas and steam distribution systems.

A mesh network is a network that includes multiple devices and multiple communication paths between the devices. In a mesh network, the devices are often RF devices and may communicate over wireless and/or wired communication paths. Each device can receive data from other devices in the mesh network as well as retransmit the data to other devices in the mesh network. A mesh network may be an ad hoc network with planned and/or unplanned infrastructure.

The transmission of data within a mesh network typically occurs from one device to the next. The data eventually arrives at the destination device as the data hops from one device to the next in the mesh network. There are instances, however, where two or more mesh networks are unable to communicate. This inability to communicate may be related to insufficient RF power, distance, and the like. Embodiments of the invention therefore group these types of mesh networks together to facilitate communication. As described in more detail below, mesh networks can be grouped on a wide variety of criteria and the connections between groups can be either passive or active and may include alternative connections using other carries and protocols.

Mesh clusters or networks are grouped or jointed in various methods and ways. Coaxial cables, for example, with splitters and attenuators can be used as passive antennas. The antennas are placed in close proximity to mesh clusters and are then able to group the clusters together without electrical contact. Coaxial cable or other cabling can be used to join clusters or group multiple clusters. This type of passive antennas can be used to propagate, for example, signals in a building to separated mesh clusters. Passive antennas, such as the coaxial cable, have a benefit of not requiring external power allowing them to be installed in locations where providing power may be difficult, costly or impossible. A possible method of grouping mesh clusters horizontally dispersed within a commercial building, such as a retail mall, may be connected through the use of a passive antenna, such as a lossy coax cable, placed on the rooftop of the commercial building.

An active connection, on the other hand, may be an RF device with a splitter. The RF device may have, for example, an antenna on one end and a direct connection to a coaxial cable on the other. In this situation, attenuators should be used to ensure that the RF device is not over powered. Active connections can also combine power line carriers (PLC) and wireless transmission. The PLC can be used to transmit signals or data through wireless dead zones. Active connections can also be achieved using other licensed or unlicensed wireless or wired solutions.

A mesh access point is where a mesh cluster or network can be tapped to access other networks including wired/wireless networks.

FIG. 1 illustrates an exemplary network composed of repeater converters 110, repeaters 115, and energy sensors 120 are used to transmit communication data packets between the energy management station 100 and the energy sensors 120. The network can include both wired and/or wireless connections. An RF device includes at least one of RF repeater converters 110, RF repeaters 115, RF energy sensors 120, RF signal strength sensors, or RF display devices 140.

The RF devices make use of an RF mesh network for communication. Using RF communications, the present embodiments may be able to reduce the cost of metering an additional point or communicating an existing metering point in an energy distribution system back to the energy management station 100 or SCADA software by significantly reducing the cost of making communication wires available at the metering point and maintaining the communication wires between the energy management station 100 and the metering point.

The energy management station 100 may be software residing on a computer or firmware residing on an intelligent electronic device (IED). The RF energy sensor 120 is a metering device or energy sensor that is able to meter at least one energy related parameter and communicate over an RF mesh network. The RF energy sensor 120 may be referred to in this document as an energy sensor 120 or a sensor 120. An energy sensor 120 may include various measurement coupling devices. This allows the energy sensor 120 to measure or couple with measurements of various forms of energy.

One example of an electrical energy sensor used to monitor electrical parameters is represented by an energy sensor 120b and energy sensor 120c using a measurement coupling device suited to measure electrical energy parameters discussed in more detail further on in this document. An alternate embodiment of the energy sensor 120 may include a measurement coupling device such as a digital input used for a pulse counter used to read pulses. An example is shown in FIG. 1, where an energy sensor 120e is monitoring pulses from a flow meter 125 over a pulse connection 145. These pulses may originate from another energy meter that may measure water, air, gas, electrical or steam energy. An alternative embodiment may contain a measurement coupling device that directly couples with the energy being measured.

The RF repeaters 115 may be referred to in this document as repeaters 115. The RF repeater converters 110 may be referred to in this document as repeater converters 110. The energy management station 100 is coupled with a repeater converter 110a that allows it to communicate over the network, which may include one or more mesh networks, and receive data from the energy sensors 120 within the network. The energy management station may have a connection to a communication backbone 105, such as an Ethernet Network, LAN or WAN, or to an alternative communication medium 160 and be able to communicate to the network through a repeater converter 110b that is connected to the communication backbone 105 or repeater converters 110a and 110c that are connected to an alternative medium, such as a satellite 130 or telephone connection shown by communication paths 160a and 160b. A communication backbone 105 may be used in the communication channel where a repeater converter 110b translates or passes the communication packet between the wireless network the communication backbone 105. The alternative communication medium 160 or communication backbone can be composed of any communication channel such as a phone network, Ethernet, intranet, Internet, satellite 130, or microwave medium. Another example of an alternative communication channel is the satellite 130 used in conjunction with repeater converters 110a and 110c over communication paths 160a and 160b.

In FIG. 1, the wireless communication paths 150a, 150b, 150c, 150d, 150e, 150f, 150g, 150h, 150i, 150j, 150k, and 150l represent some of the possible wireless communication paths possible between the RF devices. The wireless network technology used is an adhoc wireless mesh network technology. An adhoc network may have no infrastructure or may comprise an unplanned infrastructure. Careful infrastructure planning in advance is typically required with communication networks such as wired Ethernet networks. A mesh network is a network that may contain multiple paths to communicate information. The mesh network used by the present embodiments may be a partial mesh network as some nodes may connect only to those nodes with which they exchange the most data. In addition, each node may not be able to communicate directly to every other node due to RF transmission power, distances and signal to noise ratio.

RF devices such as repeater converters 110, repeaters 115, energy sensors 120, and RF display devices 140 that use the adhoc wireless mesh networking technology may be automatically recognized by the other RF devices within communication range. These additional RF devices can be used to extend the wireless network range, bandwidth, throughput, and robustness. For example, if an RF energy sensor 120 is installed in an area that is not currently within the range of the mesh network, the installer need only add appropriate repeaters 115 to extend the range of the mesh network. In another example, the system may be designed with a second repeater 115d that overlaps some of the service area of the first repeater 115b, in this scenario the RF energy sensor 120a that is in the overlapped area has at least two different communication paths, 150e-150g-150a or 150d-150b-150a, back to the energy management station 100. This increases the robustness of the system in that if the first RF repeater 115b is damaged or is temporarily blocked due to RF noise, the RF energy sensor 120a may still be able to communicate via the second repeater. The mesh network can be made secure such that additional RF devices must be either secured to the network or contain a security key that is accepted by an authentication device within the network. The communication security may comprise a public and private key system where the encrypted or sinned data and the public key are transmitted on the RF mesh network.

The RF devices may be able to automatically modify their RF transmission power to only be as strong as required to reach an RF repeater in the mesh network with adequate signal to noise ratio (SNR). Thus the network security may be enhanced as RF power is set to a minimum required level. In addition, the RF devices power supply requirements are lowered.

The repeaters 115 are used to receive and retransmit wireless packets between the energy sensors 120 and the energy management station 100 or between two RF devices. For example, the repeater 115b may facilitate communication between energy sensor 120a and display device 140 if communication path 150e is not viable. These repeaters 115 may be capable of performing routing of the wireless packet. These routing tables may be stored in the repeater in non-volatile memory so that after a power outage, network communication can quickly be restored. The RF devices may use a self-healing feature that makes use of a network architecture that can withstand a failure in at least one of its transmission paths such as a mesh or partially mesh network. The self-healing feature may allow an RF device to redirect a communication packet such as to avoid a nonfunctioning repeater 115 or RF device. In addition, the repeaters 115 may be able to determine if they are the final destination for a communication packet, decode the packet, and further carry out the instruction provided. This instruction can be the modification of a setup within the RF device, part of a firmware upgrade, communication acknowledgment, or an instruction to generate an alternate communication packet. At least a portion of the RF repeater 115 circuit may be implemented within an ASIC chip.

The repeater converters 110 may be used to repeat the RF signals as necessary in a similar manner as the repeaters. Repeater converters 110 may also be referred to as gateway devices as they may be used as a gateway between two different networks. In some cases, the RF repeater functionality may be left out of the repeater converters to reduce cost; however, when the repeater converters 110 have this capability there can be an additional cost savings as the network is extended without the requirement of a repeater 115. In addition, the repeater converters 110 may be operable to provide a bridge between the wireless mesh network and other communication devices such as a Ethernet backbone, power line carrier, phone network, internet, other wireless technologies, microwave, spread spectrum, etc. In addition, the repeater converters 110 may be able to determine if they are the final destination for a communication packet, decode the packet, and further carry out the instruction provided. This instruction can be the modification of a setup within the RF device, part of a firmware upgrade, communication acknowledgment, or an instruction to generate an alternate communication packet. At least a portion of the RF repeater converter 110 circuit may be implemented within an ASIC chip.

The energy sensors 120 may be capable of repeating the RF signals in the same way as the repeaters 115. In some cases, the RF repeater functionality may be left out of the energy sensor 120 to reduce cost; however, when the energy sensors 120 have this capability there can be an additional cost savings as the network is extended without the requirement of an RF repeater 115. Energy sensors 120 that can act as RF repeaters 115 can increase the range and robustness of the network as well as reduce the number of components required to make up the wireless mesh network. The sensors 120 have the additional task of generating a communication data packet containing a measurement that they have taken or calculated. In addition, the energy sensor 120 may report the status of the energy sensor 120. In addition, the energy sensors 120 may be able to determine if they are the final destination for a communication data packet, decode the packet, and further carry out the instruction provided. This instruction can be the modification of a setup within the energy sensor 120, part of a firmware upgrade, communication acknowledgment, or an instruction to change an output or control a device. An energy sensor 120 is used to monitor or measure at least one energy parameter. This energy parameter may be monitored directly, indirectly or via another monitoring device such as an energy meter with a pulse output or an energy meter with a communication port. Alternately, the energy sensor 120 may monitor a parameter that has an effect on an energy distribution system such as temperature, vibration, noise, breaker closure, etc. At least a portion of the energy sensor 120 circuit may be implemented within an ASIC chip.

The RF devices may include wireless RF display devices 140. These RF display devices 140 may be referred to as display devices 140 within this document. These RF display devices 140 may be mounted or adhered to the outside of a measurement cabinet. The RF display devices 140 may display readings from one or more energy sensors 120. These energy sensors 120 may be within the measurement cabinet, in the vicinity of the RF display device 140, or accessible via communications. The display devices 140 may contain user interfaces such as keypads, stylists or touch screens that allow access to various displays and quantities within the energy sensors. In addition, these RF display devices 140 are able to correlate various readings from different energy sensors 120 or specified values, perform calculations and display various parameters or derivations of parameters from the energy sensors 120 they have access to on the wireless mesh network.

For example, if an IED 135 is able to measure the voltage on the bus or the voltage is a specified constant and the expected power factor is supplied, the display device 140 is able to correlate the values and calculate various energy parameters, such as kVA, kVAR and kW with at least usable accuracy, and display them on the screen or log them into memory. The RF display devices 140 may be usable as active RF repeaters 115*d* to boost the RF signals from sensors within the measurement cabinet 200 or within the vicinity of the RF display device 140. The RF display devices 140 can be powered using the various alternate power technologies discussed in this document. At least a portion of the RF display device 140 circuit may be implemented within an ASIC chip.

The energy sensors 120 are able to take a measurement directly and provide the data wirelessly to the energy management station 100 via the RF repeaters 115 and RF repeater converters 110. Alternatively, the energy sensors 120 or other RF devices can be built into the IED 135 directly such as represented with energy sensor 120*b* built IED 135. In this example, the energy sensor 120*b* has access to at least one value or register within the IED 135 and is able to transmit the data wirelessly to the energy management station 100 using the wireless mesh network. In some configurations, depending on the integration of the IED 135, the energy sensor 120*b* is able perform IED setup, modification to registers, firmware upgrade and control of the IED 135. In an alternative embodiment, repeater converter 110 modules can be connected directly to an existing communication port on the IED 135. The repeater converters 110 may be able to draw power from the communication port of the device to power itself and provide full communication to the device over the wireless mesh network. Two examples of the power available from a communication port are power provided by a USB communication port or parasitic power drawn from an RS-232 port. Alternatively, the repeater converter 110 can be powered from an external power source or powered by an alternative power source described later on in this document.

As previously mentioned, the process of installing power metering, cabling, etc., can be quite costly. One advantage of mesh networks is the ability to transmit energy data collected by energy sensors to a remote energy management station. However, there are situations where the existing mesh networks are unable to communicate and therefore have an impact on the ability to transmit data from a source to a destination using the mesh networks. Embodiments of the invention are directed to systems and methods for grouping these mesh networks to facilitate the transfer and collection of energy data. At the same time, embodiments of the invention may also divide an existing mesh network into smaller mesh networks for various reasons, including, communication, power, and security reasons.

Figure 2:
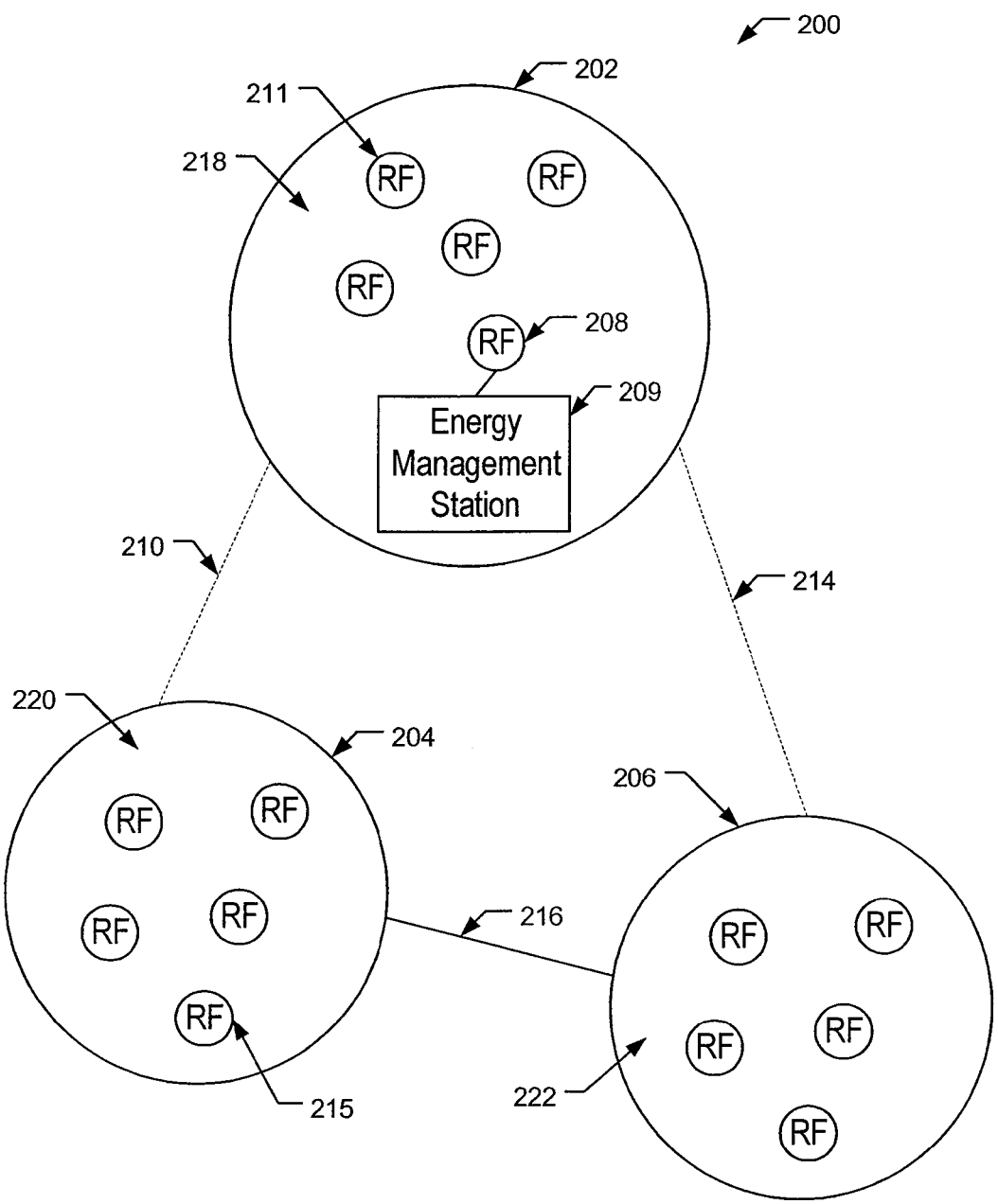
FIG. 2 illustrates one embodiment of systems and methods for grouping mesh clusters to transfer energy data.

FIG. 2 illustrates one embodiment of the invention. FIG. 2 illustrates systems and methods for grouping mesh networks or clusters. FIG. 2 illustrates a mesh cluster 202, a mesh cluster 204, and a mesh cluster 206. Each mesh cluster 202, 204, 206 includes multiple RF devices 218, 220, 222, respectively. As previously stated, the RF devices can be repeaters, repeater converters, energy sensors, gateways, and the like or any combination thereof. The mesh cluster 202, for example, may correspond to at least a portion of the network illustrated in FIG. 1.

Mesh networks can be used to transmit data to/from a particular device or node. For example, the device 208 is a device that communicates with an energy management system 209. Data generated by energy sensors, like the energy sensor 211 is routed to the device 208. The device 208 may be a repeater converter or a gateway. The energy sensor 211 likely includes a repeater as well. The repeater included or coupled to the sensor 211 can transmit the data to other devices in the cluster 202 until is arrives at the device 208. This is described previously in FIG. 1.

In another example, the device 215 in the mesh cluster 204 has data that it wants to send to the energy management station 209, which is an embodiment of the energy management station 100 in FIG. 1. In this example, a connection 210 is formed between the mesh cluster 204 and the mesh cluster 202. In effect, the mesh clusters 204 and 202 are grouped together either permanently or temporarily.

Permanently or temporarily grouping clusters can depend on various factors. Clusters can be dynamically grouped, for example, during peak recording times, when certain transmission frequencies are unused or available, when solar power is available, and the like. Clusters can be dynamically formed during a firmware upgrade or other type of configuration programming. Alternatively, mesh clusters may join and form one large cluster during a "broadcast" configuration change or firmware upgrade.

The connections 210, 214, and 216 represent connections between the mesh clusters. Once connected, the mesh clusters 202, 204, and/or 206 can be viewed as a single mesh cluster or network 200. The connections 210, 214, and 216 can be either passive or active and can be either wireless or wired. In this example, the connections 210 and 214 are wireless while the connection 216 is wired. Of course, multiple connections can also be established between the mesh clusters. This helps the grouping of mesh clusters to overcome communication problems. If the connection 210 fails, for example, then data from the device 215 can be transmitted to the energy management station 20 using the connections 216 and 214 and nodes in the mesh cluster 206.

In a passive grouping of mesh clusters, the connections 210, 214, and 216 can be achieved using directional antennas, passive antennas such as lossy coaxial cabling, and the like. Passive connections can also utilize existing infrastructure such as building wiring, system cabling, and the like.

Grouping the mesh clusters 202, 204, and/or 206 can also be active. In an active grouping of mesh clusters, the connections 210, 214, and 216 may be represented or accomplished using RF devices or nodes that have higher RF power. Solar powered repeaters can also be used. A mobile mesh repeater can also be used to group mesh clusters. In the case of a mobile mesh repeater, the grouping of mesh clusters may be temporary due to the mobile nature. The mobile mesh repeater, for example, may be connected on equipment or carried by personnel. A mobile mesh RF device may also have memory that enables the mobile mesh device to collect and store data. The collected data can be transmitted at a later time when the mobile mesh device comes within range of other mesh clusters or a gateway.

RF devices including nodes, repeaters, and gateways can utilize additional communication links in order to group mesh clusters. By way of example, these communication links include optical communication links, local area networks, plain old telephone service (POTS), IEEE 802.11a, IEEE 802.11b, IEEE 802.11g, IEEE 802.11s, etc., power line carrier (PLC), serial communications, long range RF, Ethernet, and the like or any combination thereof.

Figure 3:
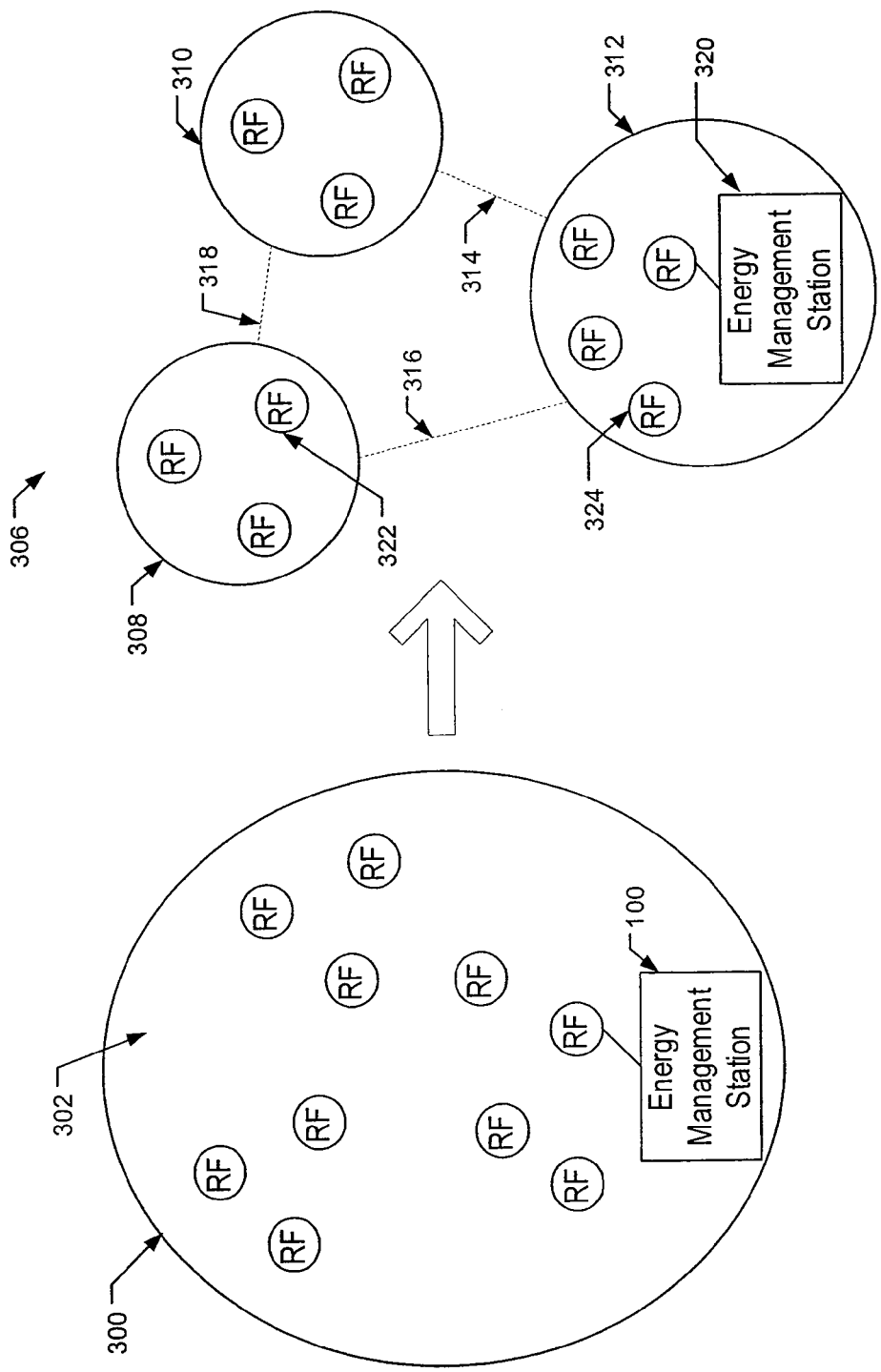
FIG. 3 illustrates another embodiment of systems and methods for grouping mesh clusters.

FIG. 3 illustrates another example of grouping mesh networks. In this example, the mesh cluster 300 is subdivided into multiple clusters 308, 310, and 312. The grouping of mesh clusters into smaller clusters by reducing the RF power. In other words, the mesh clusters may be low Dower RF zones. For example, the devices or nodes in the mesh cluster 308 can transmit with reduced power. Reduced RF power can improve security, for example. If the energy maintenance station 320 is in the mesh cluster 312, then the mesh cluster 308 can connect with the mesh network 312 over the connection 316, which can be active or passive.

A mesh network 300 can be divided into the mesh networks 308, 310, and 312 in various manners. As indicated above, low power RF modes can be used to limit the range of devices and thereby create the mesh networks in FIG. 3. In another example, the devices within the mesh network 300 can block or mask addresses. As a result, only devices with certain addresses are included within a particular mesh network. In another example, the devices in the mesh network 308 may tune or operate at a different frequency than devices or nodes in the mesh clusters 310 and 312. In another example, the use of directional antennas can separate the mesh network 308 from the mesh network 310 and 312. In another example, devices within the mesh networks may have interchangeable radios. Devices with radio "A" form the mesh cluster 310, while devices with radio "B" form the mesh cluster 312.

The mesh networks 308, 310, and 312 can be connected using the connections 314, 316, and 318, as described with reference to FIG. 2. Thus, the connections 314, 316, and 318 can represent active and/or passive connections. In some instances, the active or passive connection may be integrated with a particular RF device. For example, the device 322 may have the ability to transmit at higher RF power or may have a high gain directional antenna. Similarly, the device 324 may be similarly equipped.

The grouping of mesh clusters can also be performed using other criteria. The clusters 308, 310, and 312 may be clustered by data type (electric data, gas data, etc.), by geographic area, by measurement type, by communication type, by spatial location (floor/building/sector), by defined addresses (masking), by data (billing, power quality, trending, utility, generator, consumer etc.) Clusters may be generated to facilitate load balancing or signal to noise ratio "optimization"

The ability to group mesh clusters is not limited to situations where an existing mesh cluster is subdivided, but can be applied is the context of FIG. 2 as well. For example, the cluster 204 may be grouped with the cluster 202 based on the criteria described previously.

Figure 4:
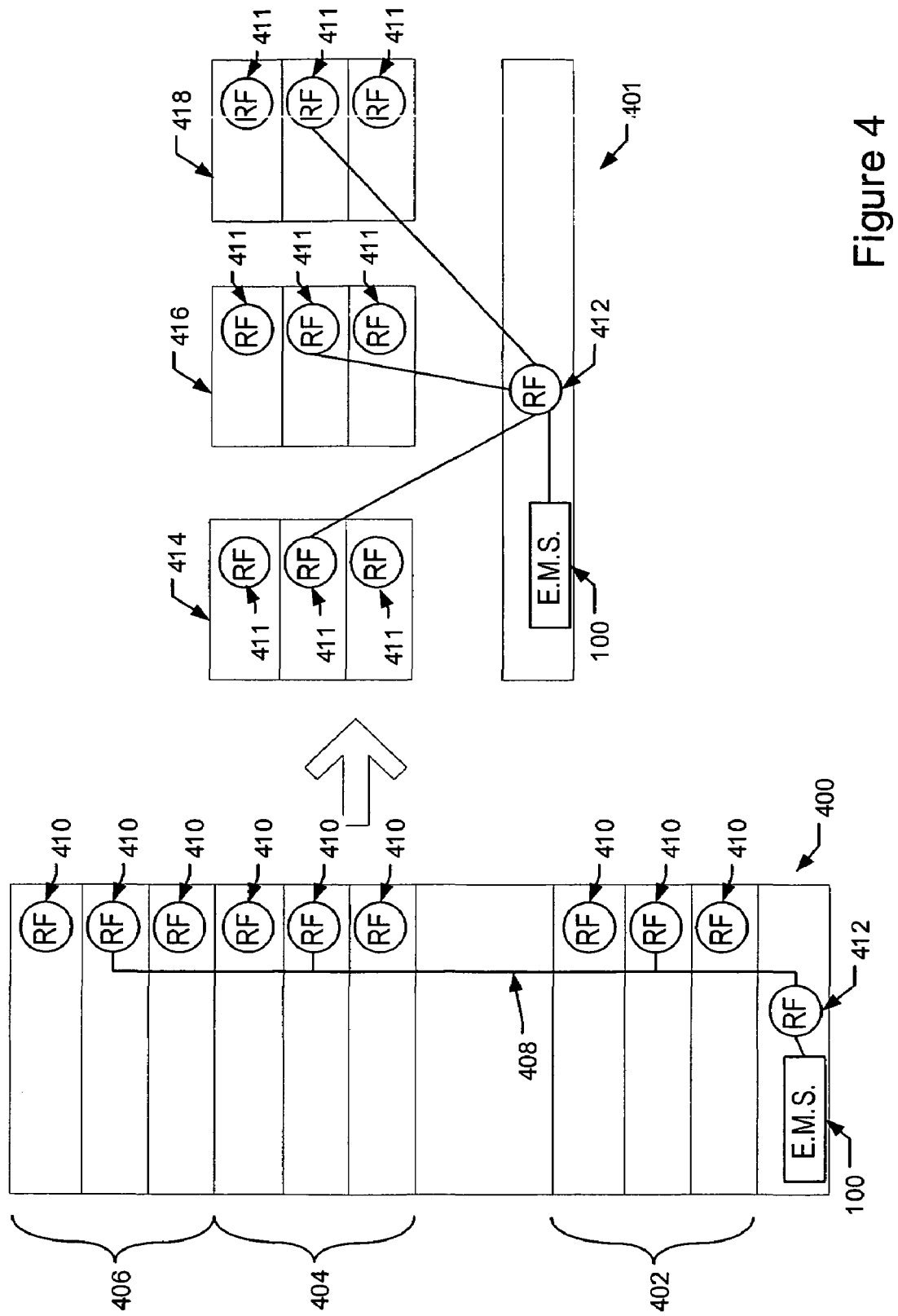
FIG. 4 illustrates exemplary mesh clusters and their groupings in a high rise building.

FIG. 4 illustrates an exemplary environment for implementing embodiments of the present invention. FIG. 4 illustrates a building 400 that includes multiple floors. In this example, each of the floors includes devices 410. The devices 410 may include energy sensors, repeaters, repeater converters, and the like or any combination thereof. In a convention building 400, the ability of a particular device on in one of the upper floors 406 to communicate energy data to the gateway 412 (which may include an energy management station 100) may require the data to be transferred through successive devices on each floor.

FIG. 4 illustrates another view of the building 401, which has grouped the various devices into multiple mesh clusters. In this example, the cluster 418 includes the devices 410 in the floors 406, the cluster 416 includes the devices 410 in the floors 404, and the cluster 414 includes the devices in the floors 402. One of skill in the art can appreciate that other mesh clusters can be formed or grouped. The ability of the devices 411 in the cluster 418 to communicate with the gateway 412 is improved in part because the path between the devices 411 and the gateway 412 is shortened.

In FIG. 4, the devices 410 can be grouped into clusters in multiple ways. Instead of installing cabling to each floor or to each of the devices 410, cabling may only be installed on a particular floor. Existing infrastructure could be used to provide alternate communication paths. The connection 408, for example, may represent wired connections and/or wireless connections. In some embodiments, other wireless connections can be used including licensed or unlicensed connections.

The devices 410 in the building 410 can be grouped into multiple groups or clusters 414, 416, and 418. Communication to each of these groups can then occur independently of communication to other groups. For example, the cluster 414 may operate at a first frequency, while the second cluster 416 operates at a second frequency. The gateway 412 or devices in the clusters may have the ability to accommodate a frequency shift. For example, a particular device may receive at a first frequency and transmit at a second frequency. The ability to accommodate a frequency shift can be used to group clusters together.

In one embodiment, the frequency shift is different from shifting channels within a particular frequency range. Rather, the shift is from one frequency band to another frequency band. The shift may be from the "900 MHz frequency band to the 2.4 or 5.8 GHZ frequency band. The shift may be from a licensed frequency band to an unlicensed frequency band and vice versa. A device may also be able to a shift to a pay for use frequency such as used by cellular telephones to provide a backup communication path.

Figure 5:
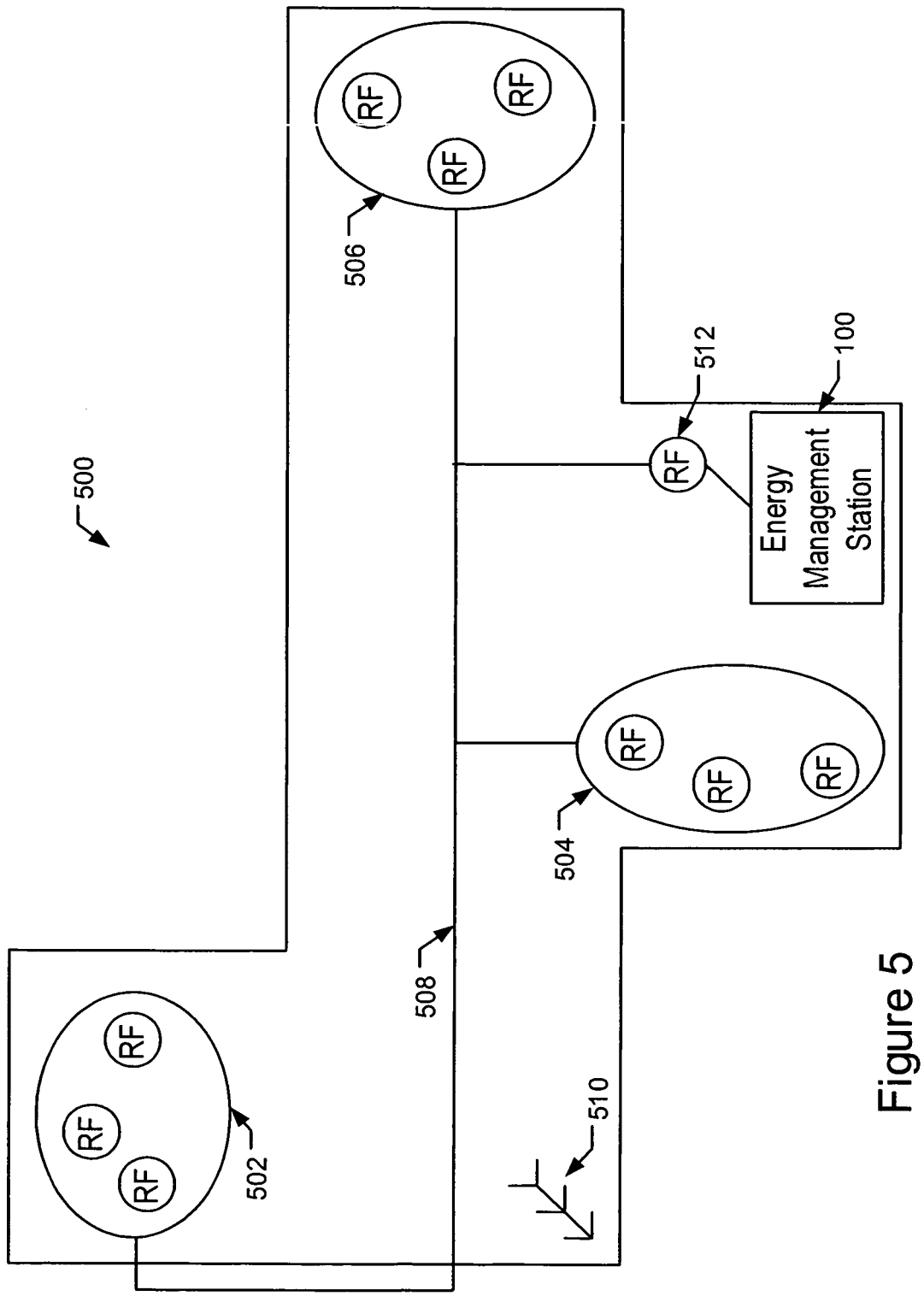
FIG. 5 illustrates an exemplary grouping of mesh clusters that are separated by a certain distance.

FIG. 5 illustrates another implementation of the present invention. In this example, the clusters 502, 504, and 506 are in a building such as a mall. The clusters 502, 504, and 506 form clusters that may not be able to communicate with other clusters. To facilitate, for example, the ability to transmit energy data from a device in the cluster 502 to the gateway 512, the clusters 502, 504, and 506 need to be grouped.

FIG. 5 illustrates examples of how the clusters 502, 504, 506 and the gateway 512 can be grouped together. A passive example is to use the high gain directional antenna 510. This antenna 510 can enable the clusters 503, 504, 506, and the gateway 512 to be grouped. In this example, the gateway 512 may be an energy sensor or RF repeater/device "picked" to become a "gateway" device in addition to performing existing functions. Alternatively, the connection 508 can be used to group the clusters together. The connection 508 may be a roof top coaxial cable. The connection 508 can also be implemented as an active connection. Solar repeaters, high power RF devices, a LAN, IEEE 802.11a, IEEE 802.11b, IEEE 802.11g, IEEE 802.11s connection, power lines, and the like can be used to group the clusters 502, 504, 506 and the gateway 512.

Figure 6:
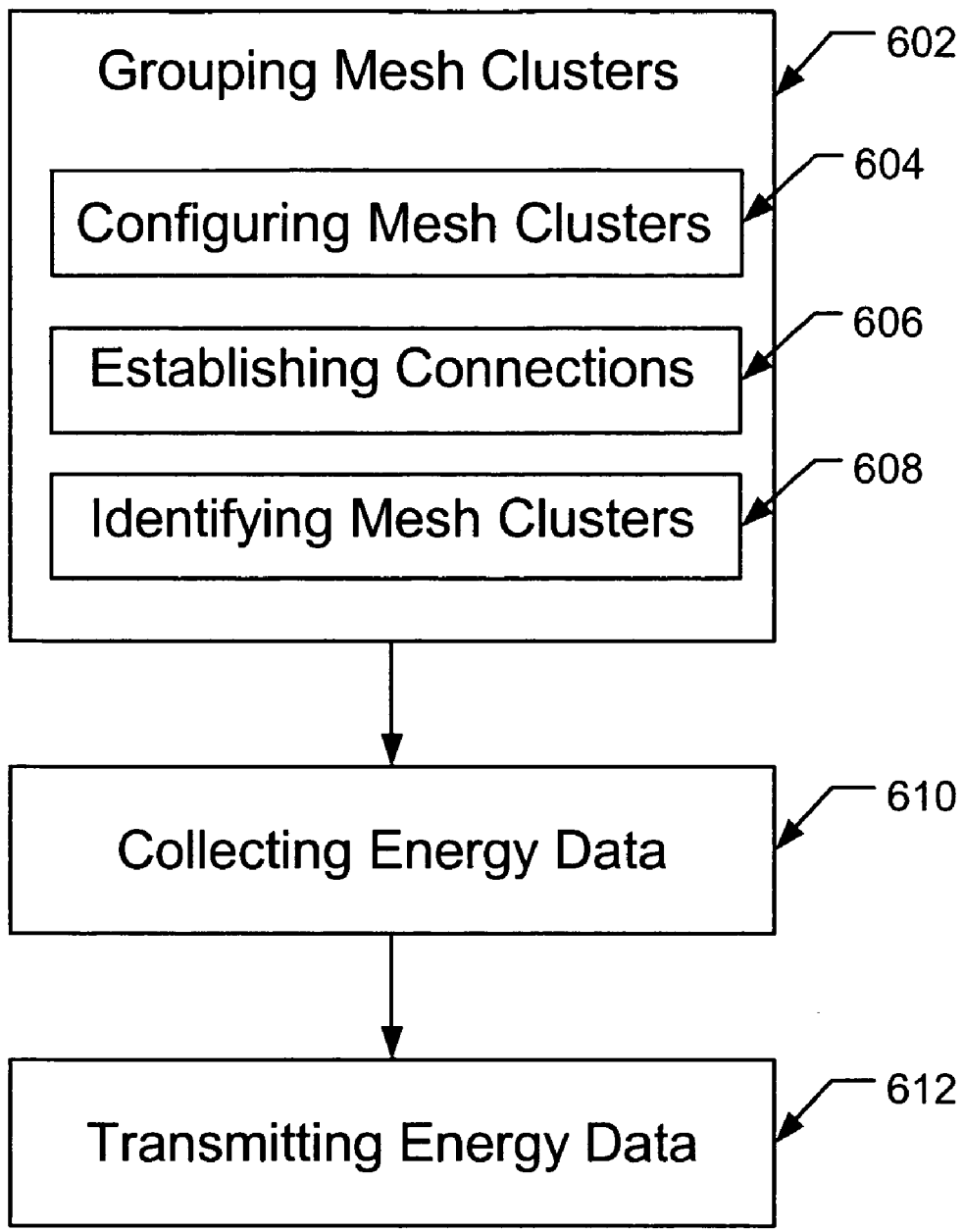
FIG. 6 illustrates an exemplary flowchart for grouping mesh clusters.

FIG. 6 illustrates an exemplary method for grouping mesh clusters in the context of transmitting energy data from a source device such as an energy sensing device to a destination device such as an energy management station 100. One of skill in the art can appreciate that other data types can be transmitted. Also, the grouping of mesh clusters can be used to transmit data to the various devices in the mesh clusters. This information can be used to set or change the function or operation of the devices in the mesh networks (change frequencies and/or RF power used for reception/transmission, identify preferred communication paths for the energy data, reprogram energy sensing devices, and the like).

An exemplary method of the invention is illustrated in FIG. 6. The method first groups one or more mesh clusters 602. Grouping mesh clusters 602 can include, by way of example, configuring mesh clusters 604 establishing connections 606 between mesh clusters, and identifying mesh clusters 608. Configuring the mesh clusters 604 can include, by way of example, identifying frequencies to be used for communication over various communication paths, providing certain devices in the mesh clusters with interchangeable wireless modules that can be set or reprogrammed manually or remotely, setting address blocks for groups of devices, setting RF power levels, and the like or any combination thereof. Establishing connections 606 can include, by way of example, installing passive or active connections to facilitate the communication between the mesh clusters. Grouping can also be done, for example, both dynamically based on commands from a user or identified characteristics of the data, or pre-set commands from a user.

As previously stated, the passive connections can include devices such as directional antennas, lossy cabling, and the like. Passive connections do not require an external power source, yet their use can enable the communication of mesh clusters that were previously unable to communicate. This has the effect of making the installation of meter devices more efficient as the data collected by these meter devices have new communication paths or connections over which the energy data can be transmitted. Similarly, instructions that originate from, for example, an energy management station, can be transmitted through grouped mesh clusters to a destination device.

The active connections can include devices that may require power. These connections include high power repeaters or RF devices, solar powered devices and the like. Establishing connections 606 can also include the use of alternate communication links such as, by way of example, optical communication, LANs, WANs, the Internet. Ethernet connections, POTS, IEEE 802.11a, IEEE 802.11b, IEEE 802.11g, IEEE 802.11s, etc., PLC, Serial RS232, RS485, etc., long range RF.

Establishing connections 606 and configuring mesh clusters 604 may also include enabling a device to scan other frequencies for bandwidth that may be used. The frequency shift may be from a licensed frequency to an unlicensed frequency, or from one frequency range such as 900 MHz range, to 2.4 GHz range or 5.8 GHz range, and vice versa. The frequency shift capabilities of devices in the mesh networks can be configured manually and/or remotely.

Identifying a mesh cluster 608 can include identifying mesh clusters or specific devices where energy data is collected 604. Identifying mesh clusters 602 may also encompass establishing a connection between two or more mesh clusters. It is possible that a connection may already exist between the two or more mesh clusters. Identifying mesh clusters 608 can also refer to grouping mesh clusters together or dividing a particular mesh cluster based on certain criteria. Examples of the criteria include, but are not limited to, data type (electric data, gas data, etc.), by geographic area, by measurement type, by communication type, by spatial location (floor/building/sector), by defined addresses (masking), by data (billing, power quality, trending, utility, generator, consumer etc.), frequency, address masking, and the like or any combination thereof.

Grouping mesh clusters 602 also encompasses creating multiple mesh clusters from a larger mesh cluster. These created mesh clusters can operate at lower power, at different frequencies, by selective communication (by blocking addresses, for example), and the like or other criteria listed above. At the same time, the created mesh clusters can also communicate to each other using the passive and/or active connections described herein.

Once the mesh clusters grouped 602, the data can be collected 610 and transmitted 612. The transmission of the data among grouped mesh clusters can be achieved in an intelligent manner, such as by analyzing RF power, the available connections to a specific device, and the like. For example, the device 115b in FIG. 1 has multiple communication paths available. It may choose to transmit the energy data from the sensor 120b over the path 150b based on, by way of example, the proximity of the device 115b to the energy management station 100, the signal to noise ration of the path 150b, and the like.

Grouping the mesh clusters 602 may also include configuring an RF device to listen for frequencies or channels and switch to one that is not used or is used minimally. A device in a mesh cluster can then switch to a frequency band that is not being used. This may enable a particular mesh cluster to transmit over long distances. The frequency spectrum can also benefit short range communications as well. For example, the RF devices may be able to use commercial spectrum that is not being used in the local area or in the area covered by the grouped mesh networks. For instance ultra high frequency (UHF) is normally reserved for TV channels. Where channels in frequencies such as UHF are not be used with a region, the premium frequencies range (normally reserved for commercial use) could be reused by devices in the mesh networks to transmit over large areas. Other licensed and unlicensed frequencies may be available to the RF device. Being able to listen for other content prior to the transmission of communication may be allow use of these frequencies, reduce collisions between other equipment, and make better use of frequency spectrum and frequencies suited to the installed environment. There may be a level of collaboration required between RF devices before a frequency shift takes place. Alternatively, the RF devices may listen on specific known frequencies for communication packets. These specific known frequencies may be programmed in a dynamic function by another RF device or by the energy management station 100.

In another example, devices in mesh clusters can accommodate frequency shifts. The frequency shift can be a manual switch or the device can be reprogrammed over the mesh networks. The device or mesh cluster can then communication using various frequency bands including licensed and unlicensed communication bands.

FIG. 5 can be used to illustrate an example of grouping mesh clusters. In the building 500 (a mall, for example) of FIG. 5, the mesh clusters 502, 504, and 506 are identified. These clusters cannot initially communicate with each other. The mesh clusters 502, 504, and 506 are then grouped. This can be done by establishing a connection between the mesh clusters 502, 504, and 506. In this example, the coaxial cabling 508 is used as a passive connection. Alternatively, the directional antenna 510 can be used to passively connect the mesh clusters 502, 504, and 506. In yet another embodiment, solar repeaters may be placed on the building 500 to establish connections between the mesh clusters 502, 504, and 506. Once the mesh clusters 502, 504, and 506 are grouped, energy data can be collected and transmitted between the mesh clusters using the connections described herein. As illustrated in FIG. 5, the mesh clusters 502, 504, and 506 may also be grouped with the gateway 512, which may be a repeater converter and is used to transmit the energy data to yet another mesh cluster over some type of connection. Alternatively, the gateway 512 may include an energy management station, which may be connected via a communication backbone 105 to another device or server.

The transmission of energy data refers to data to and/or from a particular device. Firmware upgrades, configuration parameters, and the like that are sent to various devices in the mesh clusters are within the scope of energy data. Similarly, the data collected by energy sensors as well as data collected by other devices in the grouped mesh networks are examples of energy data.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system of radio frequency ("RF") devices that communicate energy data from an energy sensing device to an energy management station, the system comprising:
    a first mesh cluster including a first RF device and an energy sensing device, wherein the energy sensing device collects energy data;
    a second mesh cluster including a second RF device, wherein at least one of the first and second device is configured to shift between licensed and unlicensed frequency bands; and
    a connection that groups the first mesh cluster with the second mesh cluster such that energy data collected by the energy device is transmitted from the first RF device to the second RF device over the connection using either the licensed or the unlicensed frequency bands.

2. A system as defined in claim 1, wherein the first RF device is at least one of a repeater, a radio, and a repeater/converter.

3. A system as defined in claim 1, wherein the second RF device is at least one of a repeater, a radio, and a repeater/converter.

4. A system as defined in claim 1, wherein at least one of the first device and the second device scans frequency bands to identify a band for use in transmitting data.

5. A system as defined in claim 1, wherein the energy data is routed within the first mesh network and the second mesh network based on at least one of:
    loads of other devices including gateways in the first mesh network and the second mesh network;
    signal to noise ratios of the communication paths to other devices in the first mesh network and the second mesh network;
    distance between the other devices in the first mesh network and the second mesh network; and
    distance between a particular device and the energy management station.

6. A system as defined in claim 1, wherein the connection comprises a passive connection.

7. A system as defined in claim 6, wherein the passive connection comprises at least one of a directional antenna.

8. A system as defined in claim 6, wherein the passive connection comprises a coaxial cable.

9. A system as defined in claim 1, wherein the connection comprises an active connection.

10. A system as defined in claim 9, wherein the active connection comprises at least one of: a high power RF device; a mobile mesh device; and a gateway.

11. A system as defined in claim 10, wherein the connection further comprises an alternate communication link.

12. A system as defined in claim 11, wherein the alternate communication link is at least one of:
    an optical communication link;
    a local area network;
    a POTS connection;
    an 802.11 connection;
    a power line carrier;
    a serial connection; and
    a long range RF connection.

13. A system of radio frequency ("RF") devices that communicate energy data from an energy sensing device to an energy management station, the system comprising:
    a first mesh network including one or more mesh clusters, wherein the one or more mesh clusters are formed from the first mesh network by reducing an RF power of RF devices in the one or more mesh clusters;
    a second mesh network including an RF device; and
    a connection between the RF device and at least one of the one or more mesh clusters of the first mesh network, wherein energy data collected in the first mesh network is delivered to the second mesh network over the connection.

14. A system as defined in claim 13, wherein each of the one or more mesh clusters masks certain addresses such that a particular address is only received by a particular mesh cluster.

15. A system as defined in claim 13, wherein each of the one or more mesh clusters operates at a different frequency.

16. A system as defined in claim 13, wherein the connection further comprises one or more alternate connections that include one or more of:
- an optical communication link;
- a local area network;
- a POTS connection
- an 802.11 connection;
- an Ethernet connection;
- a power line carrier connection;
- a serial connection; and
- a long range RF connection.

17. A system as defined in claim 13, wherein the one or more mesh clusters are connected by connections that include one or more of passive connections and active connections.

18. A system as defined in claim 17, wherein the passive connections include one or more of directional antennas and lossy coaxial cabling and wherein the active connections include one or more of high power RF devices, and solar powered repeaters.

19. A system as defined in claim 13, wherein a particular device in the one or more mesh clusters is configured to shift from a first frequency to a second frequency.

20. A system as defined in claim 19, wherein the particular device scans additional frequencies to identify a frequency that could be used for transmission of the energy data.

21. A method for grouping mesh clusters to communicate energy data from an energy sensing device to an energy management station, the method comprising:
- identifying at least a first mesh cluster and a second mesh cluster, wherein the first mesh cluster includes an energy sensing device;
- grouping the first mesh cluster with the second mesh cluster;
- identifying frequency spectrums including licensed or unlicensed frequency spectrums to be used for communication over various communication paths between the first and second mesh cluster; and
- transmitting energy data collected by the energy sensing device to the second mesh cluster using the identified frequency spectrums.

22. A method as defined in claim 21, wherein grouping the first mesh cluster with the second mesh cluster further comprises forming a passive connection between the first mesh cluster and the second mesh cluster.

23. A method as defined in claim 21, wherein forming a passive connection between the first mesh cluster and the second mesh cluster further comprises at least one of:
- connecting the first mesh cluster with the second mesh cluster using a directional antenna;
- connecting the first mesh cluster with the second mesh cluster using a passive antenna;
- connecting the first mesh cluster with the second mesh cluster using lossy coaxial cabling.

24. A method as defined in claim 21, wherein grouping the first mesh cluster with the second mesh cluster further comprises forming an active connection between the first mesh cluster and the second mesh cluster.

25. A method as defined in claim 21, wherein grouping the first mesh cluster with the second mesh cluster further comprises receiving the energy data over the identified frequency spectrums.

26. A method as defined in claim 21, further comprising transmitting data from the second mesh cluster to the first mesh cluster to the energy sensing device.

27. A method as defined in claim 24, wherein forming an active connection between the first mesh cluster and the second mesh cluster further comprises at least one of:
- providing a device in the first mesh cluster or in the second mesh cluster with higher RF power;
- connecting the first mesh cluster with the second mesh cluster using solar powered repeaters;
- transmitting the energy data to a mobile mesh device from the first mesh cluster, wherein the mobile mesh device transmits the energy data to the second mesh cluster when in range of the second mesh cluster; and
- utilizing alternate communication links to transmit the energy data.

28. A method as defined in claim 27, wherein utilizing alternate communication links to transmit the energy data further comprises one or more of:
- transmitting the energy data to the second mesh cluster using an optical communication link;
- transmitting the energy data to the second mesh cluster using a local area network;
- transmitting the energy data to the second mesh cluster using plain old telephone service;
- transmitting the energy data to the second mesh cluster using 802.11;
- transmitting the energy data to the second mesh cluster using a power line carrier;
- transmitting the energy data to the second mesh cluster using a serial connection; and
- transmitting the energy data to the second mesh cluster using long range radio frequency.

29. A method as defined in claim 21, wherein grouping the first mesh cluster with the second mesh cluster further comprises creating one or more clusters within at least one of the first mesh cluster and the second mesh cluster.

30. A method as defined in claim 29, wherein creating one or more clusters within at least one of the first mesh cluster and the second mesh cluster further comprises at least one of:
- reducing RF power of devices within at least one of the first mesh cluster and the second mesh cluster;
- blocking addresses at certain devices within at least one of the first mesh cluster and the second mesh cluster;
- using different frequencies for different devices within at least one of the first mesh cluster and the second mesh cluster.

31. A method as defined in claim 21, wherein transmitting energy data collected by the energy sensing device to the second mesh cluster further comprises routing the energy data in a predefined manner.

32. A method as defined in claim 31, wherein routing the energy data in a predefined manner further comprises using one or more gateways.

33. A method as defined in claim 32, wherein routing the energy data in a predefined manner further comprises coordinating communications between the one or more gateways.

34. A method as defined in claim 32, further comprises identifying a path for the energy data based on a signal to noise ratio.

35. A method as defined in claim 32, further comprising performing load balancing on the one or more gateways.

36. A method for grouping a first mesh cluster with additional mesh clusters, the method comprising:
- establishing a first connection between the first mesh cluster and a second mesh cluster using at least one grouping;

routing energy data from a first device in the first mesh cluster to a second device in the second mesh cluster over the first connection; and routing the energy data from the first device to the second device over an alternate connection between the first mesh cluster and the second mesh cluster when the first connection is unavailable, wherein the alternate connection is identified by the at least one device in the first mesh cluster that provides a frequency shift and that that monitors for a frequency spectrum that can accommodate transmission of the energy data.

37. A method as defined in claim 36, wherein the alternate connection is at least one of:
an optical connection;
a local area network;
a licensed or unlicensed wireless network;
an alternate frequency;
a POTS connection
a power line carrier; and
a serial connection.

38. A method as defined in claim 36, wherein the frequency spectrum monitored by the at least one device includes one or more of 802.11 networks, 802.22 networks, ultra high frequency channels, licensed wireless networks, and unlicensed wireless networks.

39. A method as defined in claim 36, wherein establishing a first connection between the first mesh cluster and a second mesh cluster further comprises at least one of:
establishing a passive connection;
establishing an active connection; and
creating additional mesh clusters within at least one of the first mesh cluster and the second mesh cluster.

40. A method as defined in claim 39, wherein the passive connection is one of a directional antenna or a lossy antenna.

41. A method as defined in claim 40, wherein the lossy antenna is a coaxial cable.

42. A method as defined in claim 39, wherein the active connection is at least one of a device with higher RF power, a solar repeater, and a mesh mobile device.

* * * * *

UNITED STATES PATENT AND TRADEMARK OFFICE
CERTIFICATE OF CORRECTION

PATENT NO.        : 7,321,316 B2
APPLICATION NO.   : 11/122411
DATED             : January 22, 2008
INVENTOR(S)       : Martin A. Hancock et al.

It is certified that error appears in the above-identified patent and that said Letters Patent is hereby corrected as shown below:

Column 1
Line 28, change "facility" to -- facilitate --

Column 3
Line 48/49 change "number devices" to -- number of devices --

Column 4
Line 16, change "lest" to -- least --

Column 7
Line 19, change "network the" to -- network and the --

Column 8
Line 1, change "sinned" to -- signed --
Line 45, change "a" to -- an --

Column 9
Line 56, 57 & 62, change "102$b$" to -- 102$a$ --
Line 57, insert -- inside -- before "IED 135"

Column 10
Line 41, change "is" to -- it --
Line 52, change "example." to -- example, --

Column 11
Line 36, change "Dower" to -- power --

Column 12
Line 12, change "is" to -- in --
Line 20, remove "in"
Line 45, change "410" to -- 400 --

Column 13
Line 10, change "503" to -- 502 --

Column 14
Line 3, change "the Internet." to -- the Internet, --
Line 17, change "602" to -- 608 --
Line 60, change "be" to -- being --

UNITED STATES PATENT AND TRADEMARK OFFICE
CERTIFICATE OF CORRECTION

PATENT NO. : 7,321,316 B2
APPLICATION NO. : 11/122411
DATED : January 22, 2008
INVENTOR(S) : Martin A. Hancock et al.

It is certified that error appears in the above-identified patent and that said Letters Patent is hereby corrected as shown below:

Line 61, change "with" to -- within --
Line 66, remove "be"

Column 15
Line 12/13 change "communication" to -- communicate --

Column 19
Line 9/10, remove "that"

Signed and Sealed this

Fourteenth Day of October, 2008

JON W. DUDAS
*Director of the United States Patent and Trademark Office*